United States Patent
Mae et al.

(10) Patent No.: US 7,962,002 B2
(45) Date of Patent: Jun. 14, 2011

(54) RECORDING APPARATUS AND METHOD, RECORDING MEDIUM, AND PROGRAM

(75) Inventors: Atsushi Mae, Tokyo (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 1014 days.

(21) Appl. No.: 10/590,475

(22) PCT Filed: Aug. 12, 2005

(86) PCT No.: PCT/JP2005/022549
§ 371 (c)(1),
(2), (4) Date: Jun. 28, 2007

(87) PCT Pub. No.: WO2006/070579
PCT Pub. Date: Jul. 6, 2006

(65) Prior Publication Data
US 2007/0286058 A1 Dec. 13, 2007

(30) Foreign Application Priority Data
Dec. 28, 2004 (JP) ................................. 2004-380999

(51) Int. Cl.
*H04N 5/78* (2006.01)
(52) U.S. Cl. ...................................... 386/225; 386/226
(58) Field of Classification Search .................... 386/46, 386/95, 98, 107, 117, 125, 126
See application file for complete search history.

(56) References Cited

U.S. PATENT DOCUMENTS

| 6,564,007 | B2 | 5/2003 | Ando et al. | |
|---|---|---|---|---|
| 6,751,399 | B1* | 6/2004 | Okabayashi et al. | 386/68 |
| 6,907,186 | B2 | 6/2005 | Ando et al. | |
| 7,352,955 | B2* | 4/2008 | Kotani | 386/52 |
| 2001/0041048 | A1 | 11/2001 | Ando et al. | |
| 2001/0046373 | A1 | 11/2001 | Ando et al. | |
| 2002/0076210 | A1 | 6/2002 | Ando et al. | |
| 2003/0210895 | A1 | 11/2003 | Aridome et al. | |

(Continued)

FOREIGN PATENT DOCUMENTS
EP 0 448 378 A2 9/1991
(Continued)

OTHER PUBLICATIONS

European Application No. 05814155.7, Summons to Attend Oral Proceedings Pursuant to Rule 115(1) EPC, mailed Jul. 2, 2010, received Jul. 7, 2010 (6 pages).

(Continued)

*Primary Examiner* — Huy T Nguyen
(74) *Attorney, Agent, or Firm* — Finnegan Henderson Farabow, Garrett & Dunner, L.L.P.

(57) ABSTRACT

The present invention relates to a recording apparatus and a method, a recording medium, and a program for allowing the relative layout of data recorded on a data recording medium to be maintained on the data recording medium without having to requiring a user to perform burdensome operation. A playback control section 82 controls reading of ARI_DATA indicating an attribute of data recorded on an optical disk from the optical disk. A data-format identifying section 86 determines whether data recorded on the optical disk is a photo movie based on the read-out ARI_DATA. If it is determined that the data recorded on the optical disk is a photo movie, a delete control section 83 controls deletion of the data from the optical disk optical disk so as to delete the photo movie. The present invention can be applied to camcorders.

10 Claims, 12 Drawing Sheets

U.S. PATENT DOCUMENTS

2004/0126097 A1    7/2004  Aridome
2005/0083414 A1*   4/2005  Hidaka et al. .............. 348/220.1

FOREIGN PATENT DOCUMENTS

| | | |
|---|---|---|
| EP | 0 971 535 A2 | 1/2000 |
| EP | 0 978 994 A2 | 2/2000 |
| EP | 1 467 562 A1 | 10/2004 |
| EP | 1 503 380 | 2/2005 |
| JP | 2000-32378 | 1/2000 |
| JP | 2000-032378 | 1/2000 |
| JP | 2003-331526 | 11/2003 |
| JP | 2003-331563 | 11/2003 |
| JP | 2004-201170 | 7/2004 |
| JP | 2004-288230 | 10/2004 |
| JP | 2004-288263 | 10/2004 |
| JP | 2004-312663 | 11/2004 |
| JP | 2004-318923 | 11/2004 |
| JP | 2006-164457 | 6/2006 |
| WO | WO 03/096342 | 11/2003 |
| WO | WO 2006/061984 A1 | 6/2006 |
| WO | WO 2006/070579 A1 | 7/2006 |

OTHER PUBLICATIONS

"Learning about your computer MS-DOS," MS-DOS User's Guide and Reference, Apr. 10, 1998, XP002914919 (28 pages).

* cited by examiner

FIG. 6

| RBP | FIELD NAME | DESCRIPTION | NUMBER OF BYTES |
|---|---|---|---|
| ADDITIONAL RECORD INFORMATION IDENTIFIER | | | Total 12 |
| 0 to 7 | ARI_DAT_ID | ADDITIONAL RECORD INFORMATION DATA IDENTIFIER | 8 |
| 8 to 9 | ARI_DAT_VER | ADDITIONAL RECORD INFORMATION VERSION | 2 |
| 10 to 11 | reserved | reserved | 2 |
| APPLICATION INFORMATION | | | Total 52 |
| 12 to 16 | VND_NAME | VENDOR NAME | 5 |
| 17 to 28 | PRD_NAME | PRODUCT NAME | 12 |
| 29 | APL_ID | APPLICATION ID | 1 |
| 30 to 61 | MNFI_DATA | Manufacturer's Information Data | 32 |
| 62 to 63 | reserved | reserved | 2 |
| RECORDING TIME INFORMATION | | | Total 8 |
| 64 to 65 | VOBU_LCL_TM_ZONE | TIME ZONE OF ARI_DATA RECORDED | 2 |
| 66 to 70 | VOBU_REC_TM | ARI_DATA RECORDING TIME | 5 |
| 71 | reserved | reserved | 1 |
| CAMERA INFORMATION | | | Total 1872 |
| 72 to 73 | F_NUM | F-NUMBER | 2 |
| 74 to 77 | EXP_TM | EXPOSURE TIME | 4 |
| 78 | EXP_PRG | EXPOSURE PROGRAM | 1 |
| 79 | EXP_PRG_EX | EXPOSURE PROGRAM EXTENSION INFORMATION | 1 |
| 80 to 81 | EXP_BIS_VAL | EXPOSURE CORRECTION VALUE | 2 |
| 82 | AGC | GAIN VALUE | 1 |
| 83 to 84 | MAX_APE_VAL | LENS MINIMUM F-NUMBER | 2 |
| 85 | FLS | FLASH | 1 |
| 86 to 87 | FCL_LEN | LENS FOCAL LENGTH | 2 |
| 88 | CST_REN | INDIVIDUAL IMAGE PROCESSING | 1 |
| 89 | WHT_BAL | WHITE BALANCE | 1 |
| 90 | SCN_CAP_TYP | PHOTOGRAPHIC SCENE TYPE | 1 |
| 91 | FCS_MOD | FOCUS MODE | 1 |
| 92 to 93 | FCS_POS | SUBJECT DISTANCE | 2 |
| 94 | IMG_STB | MOTION BLUR CORRECTION | 1 |
| 95 | DIG_ZOM | DIGITAL ZOOM FACTOR | 1 |
| 96 to 110 | GPS_INFO | POSITION INFORMATION | 14 |
| 11 | STB_LIM | MOTION BLUR CORRECTION LIMIT | 1 |
| 112 to END | reserved | reserved | |

FIG. 7

| NV_PCK | ARI_PCK | V_PCK | V_PCK | V_PCK | ... | V_PCK | V_PCK | V_PCK |

FIG. 10

DO YOU WANT TO DELETE PHOTO MOVIE?

YES    NO

RECORDING APPARATUS AND METHOD, RECORDING MEDIUM, AND PROGRAM

TECHNICAL FIELD

The present invention relates to recording apparatuses and methods, recording media, and programs, and in particular to a recording apparatus and a method for recording data onto a data recording medium, a recording medium, and a program.

BACKGROUND ART

DVD recorders for recording image or audio data onto DVDs (Digital Versatile Disc) or DVD camcorders for recording captured image or audio data onto DVDs are used.

In the process of finalizing or editing with some DVD recorders or DVD camcorders, data for displaying static images is converted into data that is composed of I (Intra) pictures in accordance with the MPEG (Moving Pictures Experts Group) scheme for displaying static images (hereinafter, referred to as photo movies). DVD players can play back photo movies. DVD players for playing back photo movies switch static images displayed from the conversion source data every several seconds to display them.

The position on a DVD at which a photo movie is recorded differs depending on the type of DVD recorder or DVD camcorder. Furthermore, regardless of the same type of DVD recorders or DVD camcorders, the position on a DVD at which a photo movie is recorded also differs depending on the format of the DVD.

Photo movies can be recorded onto DVD+RWs formatted in the DVD+RW video recording format.

In some conventional cases, information about a unit of reading/writing, which is the basic unit of writing compressed image information onto and reading compressed image information from a recording medium, includes information about a plurality of units of decoding/playback, each unit of decoding/playback being composed of one frame (or one field) of image information; the information about at least one unit of decoding/playback is compressed and encoded using only the image information in that unit of decoding/playback; and additional information about information about a plurality of units of decoding/playback in a unit of reading/writing is multiplexed and recorded in the information about the unit of reading/writing so that the additional information can be extracted independently of the compressed image information (refer to, for example, Patent Document 1).

[Patent Document 1] Japanese Unexamined Patent Application Publication No. 2004-312663

DISCLOSURE OF INVENTION

Problems to be Solved by the Invention

From a playback viewpoint, however, data for displaying a moving image cannot be discriminated from a photo movie.

In addition, there are demands for discriminating between processing permitted to act on and prohibited from acting on data for displaying moving images and processing permitted to act on and prohibited from acting on data for displaying photo movies.

There has been a problem in that processing permitted to act on and prohibited from acting on data for displaying moving images cannot be discriminated from processing permitted to act on and prohibited from acting on photo movies because it has not been possible to discriminate data for displaying a moving image from a photo movie. In contrast, it has not been possible to apply predetermined processing to data only when the data in question represents a photo movie or only when the data in question represents data for displaying a moving image.

In addition, even if the layout of data recorded on a data-appendable DVD, particularly on an optical disk, is determined such that a photo movie is recorded only at the end of the recording area on the DVD, it has not been possible to maintain the determined layout.

The present invention has been conceived in light of these circumstances, and allows the relative layout of data recorded on a data recording medium, such as an optical disk, to be maintained on the data recording medium without requiring a user to perform burdensome operations.

Means for Solving the Problems

A recording apparatus according to the present invention includes read-out control means for controlling reading of attribute data indicating an attribute of data recorded on a data recording medium from the data recording medium; determination means for determining whether the data recorded on the data recording medium is display data for displaying one static image for a predetermined period of time or display data for displaying a plurality of static images in a predetermined order one by one at a predetermined interval based on the read-out attribute data; and delete control means for controlling deletion of data from the data recording medium so as to delete the display data from the data recording medium if it is determined that the data recorded on the data recording medium is the display data.

The determination means may determine whether data recorded at a rearmost end of a logical recording space on the data recording medium is the display data, and the delete control means may control deletion of data from the data recording medium so as to delete the display data recorded at the rearmost end of the logical recording space of the data recording medium.

The read-out control means may control reading of the attribute data from the data recording medium so as to read from the data recording medium the attribute data indicating an attribute of data recorded at a rearmost end of a logical recording space of the data recording medium when the data recording medium is mounted or when the read-out control means is started up, and the delete control means may control deletion of data from the data recording medium so as to delete the display data recorded at the rearmost end of the logical recording space of the data recording medium if it is determined that the data recorded on the data recording medium is the display data when the data recording medium is mounted or the delete control means is started up.

The recording apparatus may further include display control means for controlling image display so as to display an image for acquiring an instruction for deleting the display data from a user if it is determined that the data recorded on the data recording medium is the display data, wherein the delete control means may control deletion of data from the data recording medium so as to delete the display data from the data recording medium if deletion of the display data is specified.

The recording apparatus may further include recording control means for controlling recording onto the data recording medium so as to prevent recording of data onto the data recording medium if deletion of the display data is not specified by the user, wherein the delete control means may control deletion of data from the data recording medium so as not to delete the display data from the data recording medium if deletion of the display data is not specified by the user.

A recording method according to the present invention includes a read-out control step of controlling reading of attribute data indicating an attribute of data recorded on a data recording medium from the data recording medium; a determination step of determining whether the data recorded on the data recording medium is display data for displaying one static image for a predetermined period of time or display data for displaying a plurality of static images in a predetermined order one by one at a predetermined interval based on the read-out attribute data; and a delete control step of controlling deletion of data from the data recording medium so as to delete the display data from the data recording medium if it is determined that the data recorded on the data recording medium is the display data.

A program on a recording medium according to the present invention includes a read-out control step of controlling reading of attribute data indicating an attribute of data recorded on a data recording medium from the data recording medium; a determination step of determining whether the data recorded on the data recording medium is display data for displaying one static image for a predetermined period of time or display data for displaying a plurality of static images in a predetermined order one by one at a predetermined interval based on the read-out attribute data; and a delete control step of controlling deletion of data from the data recording medium so as to delete the display data from the data recording medium if it is determined that the data recorded on the data recording medium is the display data.

A program according to the present invention causes a computer to execute a read-out control step of controlling reading of attribute data indicating an attribute of data recorded on a data recording medium from the data recording medium; a determination step of determining whether the data recorded on the data recording medium is display data for displaying one static image for a predetermined period of time or display data for displaying a plurality of static images in a predetermined order one by one at a predetermined interval based on the read-out attribute data; and a delete control step of controlling deletion of data from the data recording medium so as to delete the display data from the data recording medium if it is determined that the data recorded on the data recording medium is the display data.

According to the recording apparatus and the method, the recording medium, and the program of the present invention, reading of attribute data indicating an attribute of data recorded on a data recording medium from the data recording medium is controlled; it is determined whether the data recorded on the data recording medium is display data for displaying one static image for a predetermined period of time or display data for displaying a plurality of static images in a predetermined order one by one at a predetermined interval based on the read-out attribute data; and deletion of data from the data recording medium is controlled so as to delete the display data from the data recording medium if it is determined that the data recorded on the data recording medium is the display data.

The recording apparatus may be an independent apparatus or may be a block for carrying out recording by the recording/playback apparatus.

Advantages

As described above, according to the present invention, data recorded on a data recording medium can be identified.

In addition, according to the present invention, the relative layout of data recorded on a data recording medium can be maintained on the data recording medium without requiring a user to perform burdensome operations.

BRIEF DESCRIPTION OF THE DRAWINGS

FIG. 6 is a diagram illustrating ARI_DATA.

FIG. 7 is a diagram illustrating an example of a photo movie.

FIG. 10 is a diagram illustrating an example of a dialog.

REFERENCE NUMERALS 11 control section, 12 input section, 13 input/output signal control section, 14 encoding/decoding section, 15 work memory, 16 drive, 17 optical disk, 31 processor, 32 ROM, 33 RAM, 41 magnetic disk, 42 magneto-optical disk, 43 semiconductor memory, 71 recording/playback control section, 81 recording control section, 82 playback control section, 83 delete control section, 84 type identifying section, 85 ARI_DATA interpreting section, 86 data-format identifying section, 87 input control section, 88 display control section Best Mode for Carrying Out the Invention FIG. 1 is a block diagram depicting the structure of one embodiment of a recording/playback apparatus according to the present invention. This recording/playback apparatus records various types of data onto a mounted optical disk or reads out and plays back data recorded on the mounted optical disk. For example, the recording/playback apparatus can be realized by a stationary recorder or a recorder with an image-capture function for capturing moving images or static images, that is, a so-called camcorder.

Figure 1:
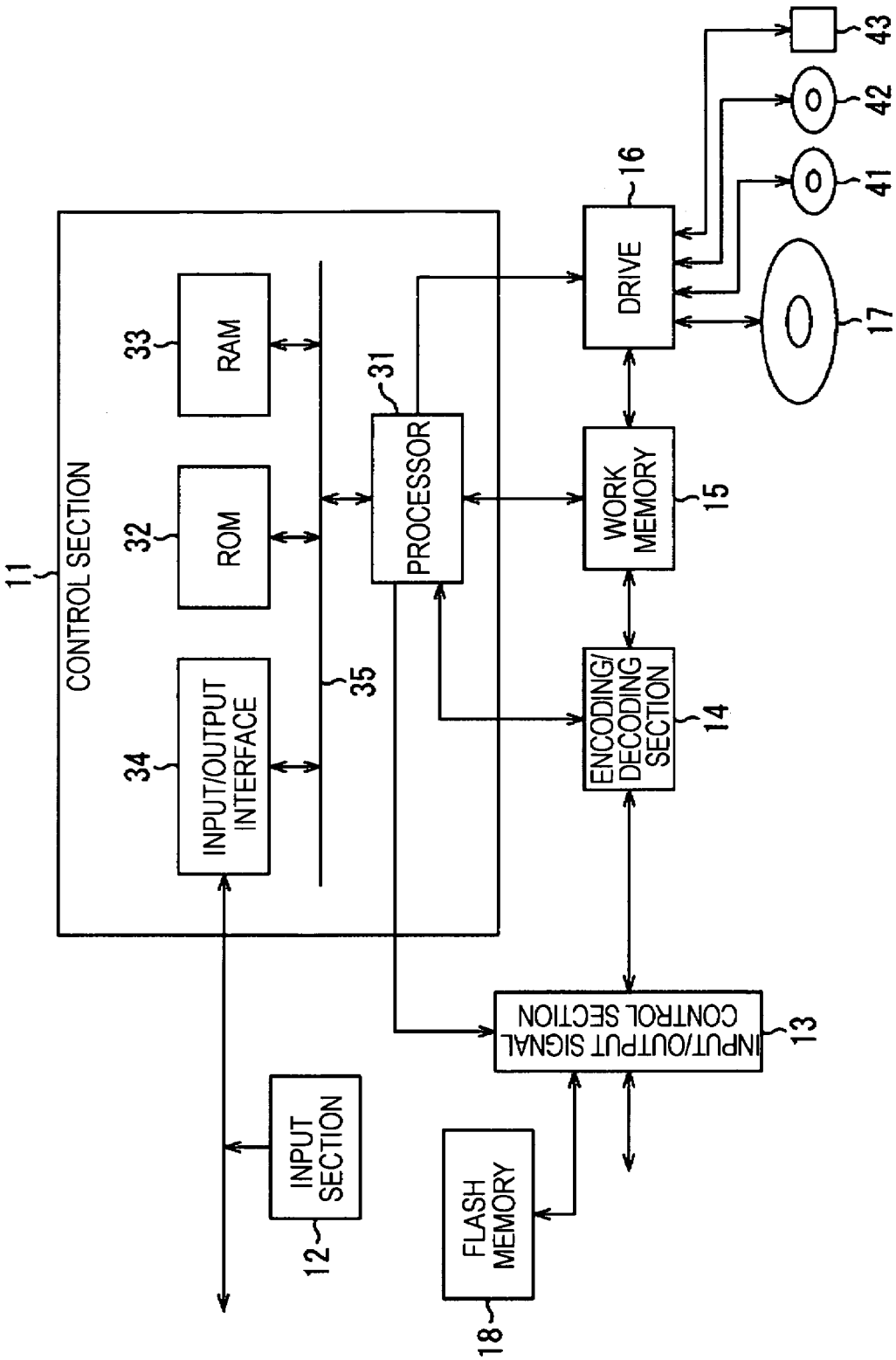
FIG. 1 is a block diagram depicting the structure of one embodiment of a recording/playback apparatus according to the present invention.

A control section 11 controls the entire recording/playback apparatus. For example, based on a signal indicating a command from a user supplied from an input section 12, the control section 11 controls recording of data onto a mounted optical disk 17 or reading of data from the optical disk 17 by the recording/playback apparatus.

An input/output signal control section 13 controls input of data supplied from the outside or controls output of data to the outside under the control of the control section 11. Furthermore, the input/output signal control section 13 captures an image (image data) supplied from an encoding/decoding section 14 and supplies the captured image (image data) to the encoding/decoding section 14 under the control of the control section 11. More specifically, the input/output signal control section 13 acquires an image (image data) supplied from the encoding/decoding section 14 and stores the acquired image (image data) in a built-in memory. Thereafter, the input/output signal control section 13 supplies the stored image (image data) to the encoding/decoding section 14.

For example, the input/output signal control section 13 supplies display data to a display apparatus (not shown in the figure), such as a plasma display or an LCD (Liquid Crystal Display), to display an image on the display apparatus.

The encoding/decoding section 14 encodes image data for static images or moving images by a predetermined method under the control of the control section 11. In addition, under the control of the control section 11, the encoding/decoding section 14 decodes image data for static images or moving images encoded by a predetermined method. For example, the encoding/decoding section 14 decodes image data for a static image encoded in accordance with the JPEG (Joint Photographic Experts Group) scheme. Furthermore, for example, the encoding/decoding section 14 encodes image data as an I picture in accordance with the MPEG scheme to generate a photo movie, which is image data for displaying a static image for a predetermined period of time.

Here, a photo movie is data for displaying one static image for a predetermined period of time or data for displaying a plurality of static images in a predetermined order one by one at a predetermined interval.

The encoding/decoding section 14 decodes data encoded as an I picture in accordance with the MPEG scheme, included in a photo movie.

Furthermore, the encoding/decoding section 14 encodes image data for displaying moving images and audio data for outputting sound, supplied from the input/output signal control section 13, by using the MPEG scheme. The encoding/decoding section 14 multiplexes image data and audio data obtained as a result of encoding and outputs the multiplexed image data and audio data as a stream.

A work memory 15 is realized by a semiconductor memory, such as an SRAM (Static Random Access Memory) or an SDRAM (Dynamic Random Access Memory), and temporarily stores data supplied from a drive 16 or data supplied from the encoding/decoding section 14 under the control of the control section 11. The work memory 15 supplies the stored data to the drive 16 or the encoding/decoding section 14 under the control of the control section 11.

The drive 16 writes data supplied from the work memory 15 onto the mounted optical disk 17 or reads out data from the mounted optical disk 17 and supplies it to the work memory 15 under the control of the control section 11.

Furthermore, a flash memory 18 is built in the recording/playback apparatus or is detachably mounted in the recording/playback apparatus as a removable medium. The flash memory 18 supplies image data for stored static images to the encoding/decoding section 14 via the input/output signal control section 13.

The control section 11 includes a processor 13, a ROM (Read Only Memory) 32, a RAM (Random Access Memory) 33, an input/output interface 34, and a bus 35. The processor 13 is realized by a general-purpose CPU (Central Processing Unit), a general-purpose MPU (Micro Processing Unit), or a dedicated CPU and executes programs stored in the ROM 32 or the RAM 33 to control the entire recording/playback apparatus.

For example, the processor 13, which executes programs stored in the ROM 32 or the RAM 33, controls the input/output signal control section 13, the encoding/decoding section 14, the work memory 15, and the drive 16 based on data stored in the ROM 32 or RAM 33 or signals supplied from the encoding/decoding section 14 or the drive 16.

Furthermore, the processor 13 controls the input/output signal control section 13, the encoding/decoding section 14, the work memory 15, and the drive 16 based on signals, indicating user commands, supplied from the input section 12 via the input/output interface 34 and the bus 35.

For example, the processor 13 controls input and output of data of the input/output signal control section 13. More specifically, the processor 13 causes the input/output signal control section 13 to capture an image (image data) supplied from the encoding/decoding section 14 and to supply the captured image (image data) to the encoding/decoding section 14.

In addition, the processor 13 controls, for example, start or stop of encoding or decoding by the encoding/decoding section 14. More specifically, the processor 13 causes the encoding/decoding section 14 to start or stop decoding of image data for static images encoded by the JPEG scheme. In addition, the processor 13 causes the encoding/decoding section 14 to start or stop encoding of image data as an I picture in accordance with the MPEG scheme.

Furthermore, the processor 13 controls, for example, storage of data in the work memory 15. More particularly, the processor 13 temporarily stores data supplied from the drive 16 or data supplied from the encoding/decoding section 14 in a storage area at a desired address of the work memory 15.

Furthermore, the processor 13 controls, for example, writing data onto the optical disk 17 in the drive 16 and reading data from the optical disk 17.

The ROM 32 is realized by an EEPROM (Electrically Erasable Programmable Read Only Memory)), such as a flash memory, and stores programs executed by the processor 13 and various types of parameters serving as fixed parameters necessary to execute such programs. The RAM 33 stores programs executed by the processor 13 and variable work data and variable parameters necessary to execute the programs.

The input/output interface 34 acquires data input from the outside, such as a signal indicating a user command from the input section 12, and externally outputs data such as a result of processing by the processor 31. For example, the input/output interface 34 acquires updated programs which are executed by the processor 31.

The bus 35 interconnects the processor 13, the ROM 32, the RAM 33, and the input/output interface 34.

Programs executed by the processor 31 are acquired not only via the input/output interface 34 but also by making the drive 16 read the programs from the mounted optical disk 17 or from a mounted magnetic disk 41, a magneto-optical disk 42, or a semiconductor memory 43. Programs read out from the optical disk 17, the magnetic disk 41, the magneto-optical disk 42, or the semiconductor memory 43 are stored in, for example, the ROM 32 and are then executed by the processor 31.

Figure 2:
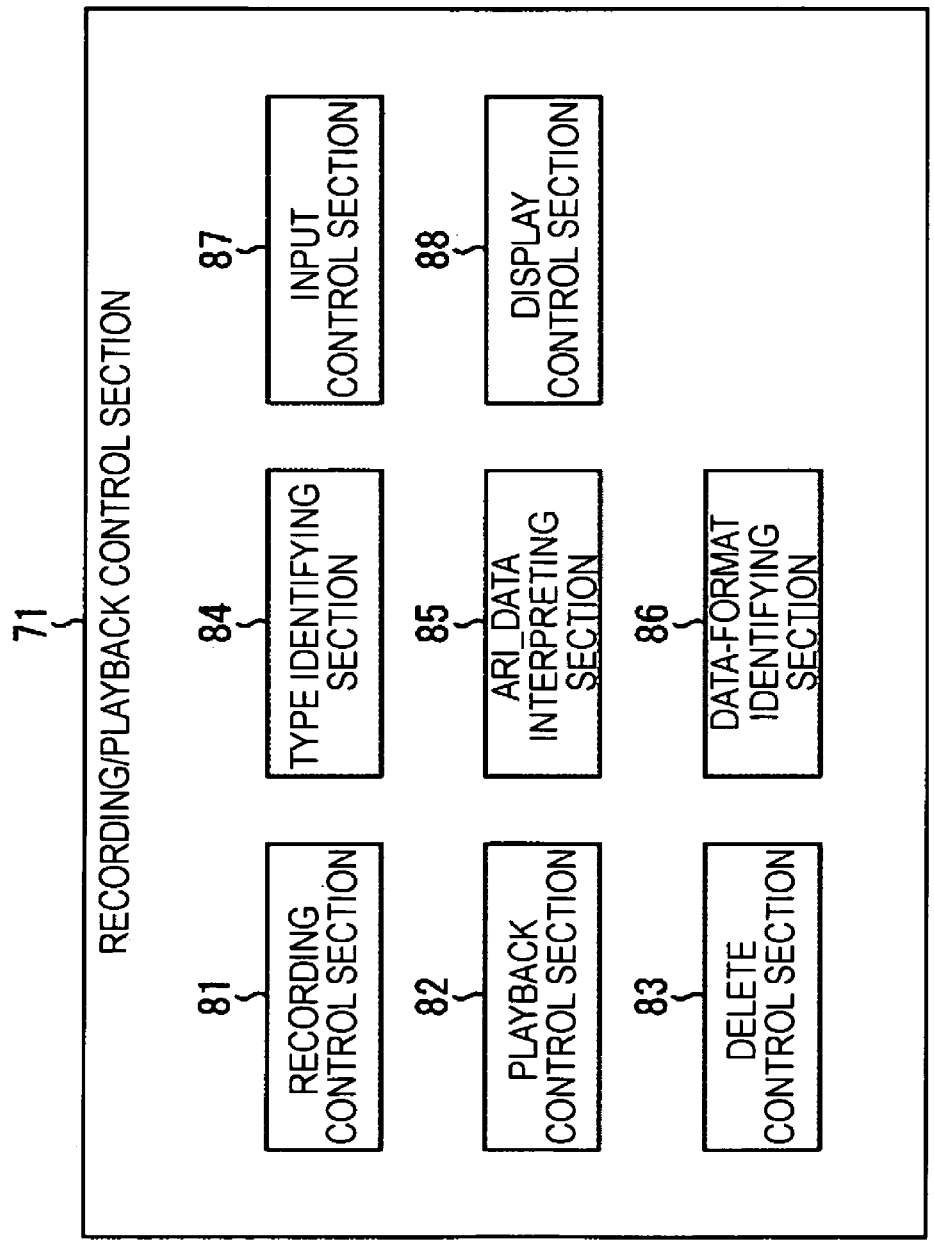
FIG. 2 is a block diagram depicting the structure of a recording/playback control section which is a function achieved by a processor for executing programs.

FIG. 2 is a block diagram depicting the structure of a recording/playback control section 71 which is a function achieved by the processor 31 executing programs. The recording/playback control section 71 includes a recording control section 81, a playback control section 82, a delete control section 83, a type identifying section 84, an ARI_DATA interpreting section 85, a data-format identifying section 86, an input control section 87, and a display control section 88.

The recording control section 81 controls the input/output signal control section 13, the encoding/decoding section 14, the work memory 15, and the drive 16 to control recording of data onto the mounted optical disk 17. The playback control section 82 controls the input/output signal control section 13, the encoding/decoding section 14, the work memory 15, and the drive 16 to control reading of data from the mounted optical disk 17 and playback of the read data.

The delete control section 83 controls the drive 16 to control deletion of predetermined data from among the data recorded on the mounted optical disk 17.

The type identifying section 84 determines the physical format of the optical disk 17 and the type of the optical disk 17, which is a formatting method for the optical disk 17, based on data recorded on the optical disk 17 and parameters related to the driving of the optical disk 17, such as the reflectance of the optical disk 17 and the frequencies of signals from the optical disk 17, supplied from the drive 16.

The ARI_DATA interpreting section 85 interprets ARI_DATA, which is additional data (additional information) about data recorded on the optical disk 17 and which is read from the optical disk 17. Details of the additional information ARI_DATA will be described later.

As a result of interpreting the ARI_DATA, the ARI_DATA interpreting section 85 outputs data (metadata) indicating the content of data recorded on the optical disk 17.

The data-format identifying section 86 determines whether data recorded on the optical disk 17 is a predetermined format. For example, the data-format identifying section 86 determines whether data recorded on the optical disk 17 is a photo movie.

The input control section 87 controls input of a signal indicating a user command supplied from the input section 12 via the input/output interface 34. The display control section 88 controls display of images on the display apparatus (not shown in the figure) connected to the input/output signal control section 13.

Figure 3:
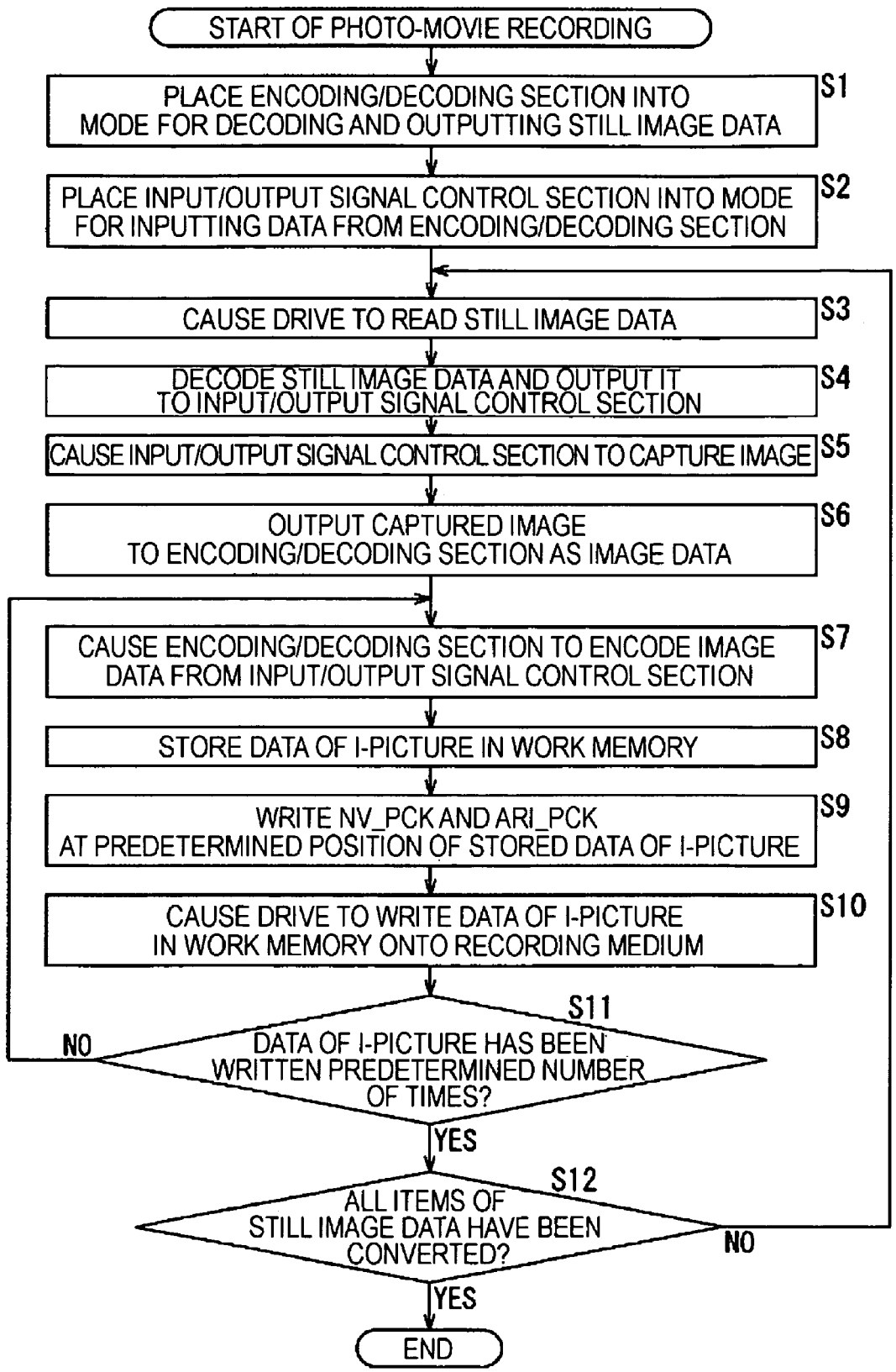
FIG. 3 is a flowchart illustrating processing for recording a photo movie.

Next, processing for recording a photo movie by the recording/playback apparatus will now be described with reference to the flowchart in FIG. 3. In step S1, the recording control section 81 places the encoding/decoding section 14 into a mode for decoding (decoding) static image data, which is image data for displaying static images, and outputting the static image data to the outside. By doing so, when static image data encoded, for example, by the JPEG scheme is supplied, the encoding/decoding section 14 decodes the static image data encoded by the JPEG scheme and outputs non-encoded data, that is, so-called baseband static image data obtained as a result of decoding.

In step S2, the recording control section 81 places the input/output signal control section 13 into a mode for inputting data from the encoding/decoding section 14. By doing so, when baseband static image data is supplied from the encoding/decoding section 14, the input/output signal control section 13 inputs the baseband static image data.

In step S3, the recording control section 81 causes the drive 16 to read out from the mounted optical disk 17 recorded static image data that is encoded in accordance with a predetermined encoding technique, such as the JPEG scheme. The drive 16 supplies the encoded static image data that has been read out from the optical disk 17 to the work memory 15. The work memory 15 stores the static image data supplied from the drive 16.

The recording control section 81 may read out encoded static image data from another recording medium, such as the flash memory 18.

In step S4, the recording control section 81 causes the encoding/decoding section 14 to acquire the stored static image data from the work memory 15 and decode the acquired static image data. Thereafter, the recording control section 81 causes the encoding/decoding section 14 to output non-encoded data, that is, so-called baseband static image data obtained as a result of decoding to the input/output signal control section 13.

In step S5, the recording control section 81 causes the input/output signal control section 13 to capture an image. More specifically, in step S5, the input/output signal control section 13 acquires the baseband static image data supplied from the encoding/decoding section 14 and captures an image by storing image data according to the acquired static image data in the memory built in the input/output signal control section 13.

In step S6, the recording control section 81 causes the input/output signal control section 13 to output the captured image to the encoding/decoding section 14. For example, in step S6, the input/output signal control section 13 outputs the stored image data to the encoding/decoding section 14 continuously over time. The image data output from the input/output signal control section 13 is data for displaying a temporally constant image for a predetermined period of time.

In step S7, the recording control section 81 causes the encoding/decoding section 14 to encode the captured image output from the input/output signal control section 13, that is, image data. In step S7, the encoding/decoding section 14 encodes the image data output from the input/output signal control section 13 as an I picture in accordance with the MPEG scheme.

The encoding/decoding section 14 supplies the data as an I picture in accordance with the MPEG scheme, that is, the encoded image data to the work memory 15.

In step S8, the recording control section 81 stores the data as an I picture, which is the encoded image data supplied from the encoding/decoding section 14, in the work memory 15. For example, the work memory 15 stores the data as an I picture, that is, the encoded image data at the address specified by the recording control section 81.

In step S9, the recording control section 81 writes a navigation pack NV_PCK and an additional information pack ARI_PCK at predetermined positions of the data as an I picture stored in the work memory 15. The NV_PCK and the ARI_PCK are additional data to an I picture to be recorded onto the optical disk 17. Details of the NV_PCK and the ARI_PCK will be described later.

For example, in step S9, the recording control section 81 writes an NV_PCK and an ARI_PCK into areas corresponding to the addresses previous to the address at which the data as an I picture is stored in the work memory 15.

In step S10, the recording control section 81 causes the drive 16 to write onto the optical disk 17 the data as an I picture, additionally provided with the NV_PCK and the ARI_PCK, stored in the work memory 15. For example, in step S10, the recording control section 81 causes the drive 16 to write the data as an I picture additionally provided with the NV_PCK and the ARI_PCK into a predetermined recording area on the optical disk 17. More specifically, in step S10, the drive 16 writes the data as an I picture additionally provided with the NV_PCK and the ARI_PCK into an area subsequent to the data-recorded area of the recording area on the optical disk 17. For example, the drive 16 writes the data as an I picture additionally provided with the NV_PCK and the ARI_PCK into the rearmost end in the logical recording space of the optical disk 17.

In step S11, the recording control section 81 determines whether the data as an I picture has been recorded a predetermined number of times. If it is determined that the data as an I picture has not been recorded a predetermined number of times, the flow returns to step S7, where the above-described processing is repeated to record the data as an I picture a predetermined number of times.

The processing from steps S7 to S10 is repeated in order to make the data as an I picture have different timestamps PTS on the optical disk 17, though the data as an I picture displays the same image. The timestamp PTS will be described later.

As described above, by repeatedly recording the data as an I picture a predetermined number of times, a photo movie is recorded on the record optical disk 17.

If it is determined in step S11 that the data as an I picture has been recorded a predetermined number of times, the flow proceeds to step S12, where the recording control section 81 determines whether all static image data have been converted. If it is determined in step S12 that not all static image data have been converted, the flow returns to step S3 to repeat the above-described processing for the subsequent static image data.

If it is determined in step S12 that all static image data have been converted, the processing ends.

In this manner, a photo movie according to static image data is recorded on the optical disk 17.

The ARI_DATA, the NV_PCK, and the ARI_PCK will now be described with reference to FIGS. 4 to 6.

First, the DVD+RW video recording format will be described. A logical layout of data recorded on the optical disk 17 in accordance with the DVD+RW video recording format is shown in FIG. 4.

Figure 4:
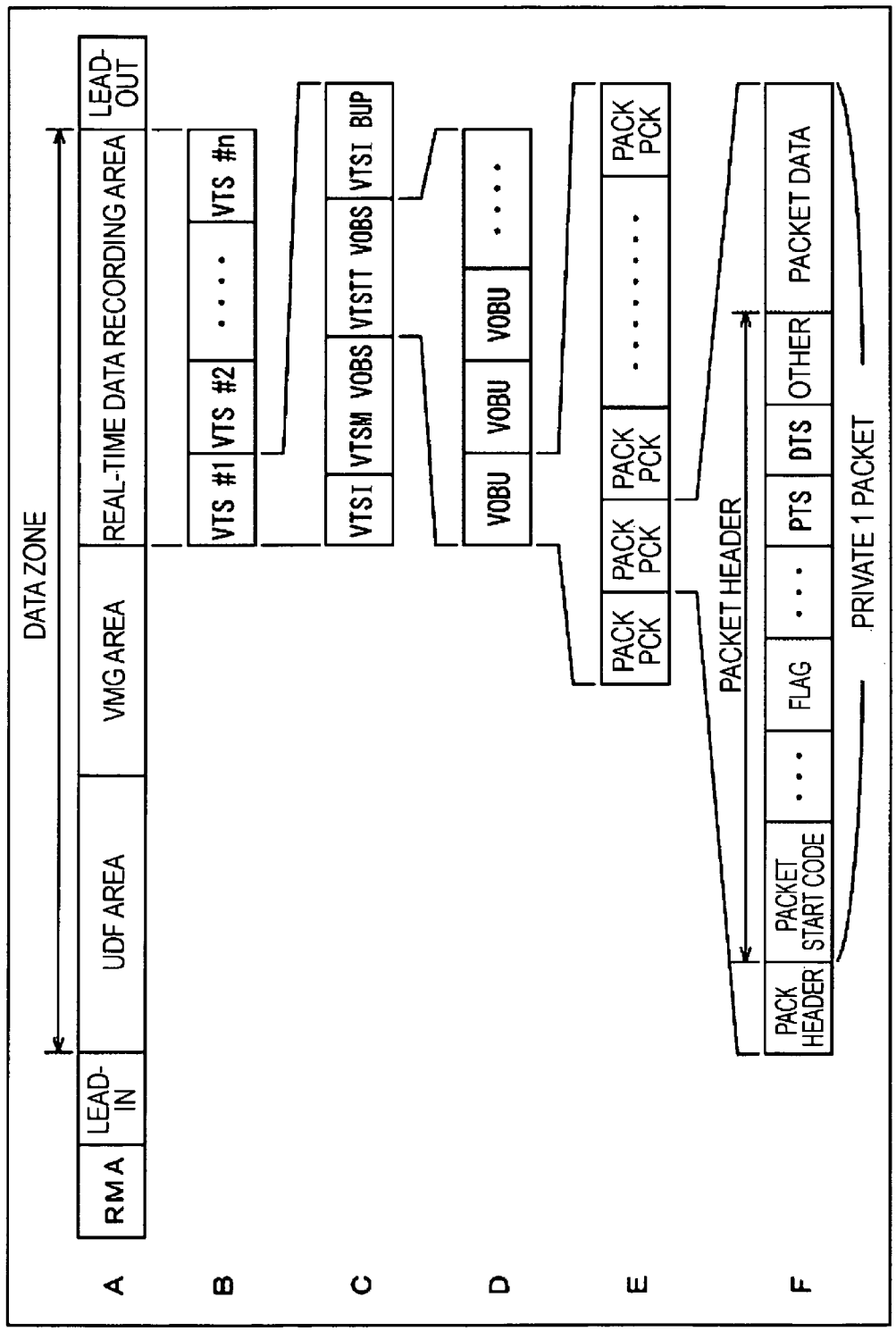
FIG. 4 is a diagram illustrating a DVD+RW video recording format.

More specifically, as shown in A of FIG. 4, the recording area of an optical disk is divided into a lead-in area, a data zone area, and a lead-out area in that order starting from the innermost end along the radial direction of the optical disk. Data such as management information and image data is recorded in the data zone area.

The data zone area is divided into a UDF (Universal Disc Format) area, a VMG (Video ManaGer) area, and a real-time data recording area in that order starting from the lead-in area side. The UDF area and the VMG area are areas for recording management information for managing files, such as image data, recorded on the optical disk 17. The UDF area supports the UDF standard and the ISO9660 standard to allow a computer to read the optical disk 17. The VMG area is an area for recording information for DVD management.

The real-time data recording area is an area for recording image data and audio data, and as shown in B of FIG. 4, data is recorded in units of a set of data called a VTS (Video Title Set).

As shown in C of FIG. 4, a VTS includes a VTSI (Video Title Set Information), a VTSM_VOBS (Video Object SetFor the VTSM), a VTSTT_VOBS (Video Object Set For Titles in a VTS), and a VTSI_BUP (Backup of VTSI).

As shown in D of FIG. 4, in the VTSTT_VOBS, compression data in the MPEG2-PS format is recorded in information blocks called a VOBU (Video Object Unit) as the basic unit of reading/writing. In the VOBU, 1GOP including at least one I picture is included for image data, while information corresponding to that 1GOP is included for audio data. In short, this is equivalent to data being read and written on an optical disk in units of 1GOP. According to this embodiment, the VOBU includes additional information about 1GOP of image data, as described later.

Management information, such as recording location information of, for example, image data, is recorded in the VTSI. In addition, a root menu for, for example, image data is recorded in the VTSM_VOBS. This VTSM_VOBS is optional. The VTSI_BUP is backup information for the VTSI.

As shown in E of FIG. 4, the data VOBU, which is the unit of reading/writing, includes a plurality of packs PCK. Each pack PCK can include one or more packets. This example assumes that one pack includes one packet. According to the DVD+RW video recording format, one pack is defined as being composed of 2048 bytes (equivalent to one sector).

One pack in this example is as shown in F of FIG. 4. More specifically, the head of a pack PCK is a pack header. Subsequently to the pack header exists a packet header, followed by packet data including image data and audio data. Packs including image data as the packet data are referred to as video packs. Packs including audio data as the packet data are referred to as audio packs. The packet format of these image data and audio data is a private 1 packet.

In this description, packs including image data as the packet data are referred to as video packs, and packs including audio data as the packet data are referred to as audio packs.

The pack header of each pack includes the above-described time-based information SCR. The packet header starts with a packet start code, and furthermore, this packet header includes flag information, such as a PTS flag and a DTS flag, and timestamps PTS and DTS. The PTS flag and the DTS flag indicate whether the packet in question includes timestamps PTS and DTS. As described above, if the packet includes the first of pictures, the timestamps PTS and DTS are added in the packet header.

Image data and audio data are recorded on the optical disk 17 based on the above-described DVD+RW video recording format. Furthermore, for example, in a computer, when image data and audio data are to be read from the optical disk 17 on which the image data and audio data are recorded in the DVD+RW video recording format, a search is made for the desired file based on the information in the UDF area to play back the file. In addition, when the above-described image data and audio data recorded on the optical disk 17 are to be played back on a DVD player, a search is made for the beginning of the VMG area based on the information in the UDF area to make a search for the desired title based on the information in the VMG area to play back the title.

Next, the ARI_DATA, the NV_PCK, and the ARI_PCK will be described in detail. In this example, additional information such as the ARI_DATA, NV_PCK, and ARI_PCK is multiplexed as one pack of information on a 1VOBU-by-1VOBU basis. In the following description, packs including additional information as the packet data are referred to as additional information packs.

In this example, a GOP includes one I picture, and additional information is image-capture information, such as image-capture setting conditions, when the frame of the I picture is captured as an imaging signal.

In this example, the packet of additional information in an additional information pack is in the private 1 packet format. Also in this example, the packet of additional information includes the same timestamp PTS as the timestamp PTS added to the first video pack of image data of the corresponding I pictures.

The multiplexing position of this pack of additional information is a predetermined position in the VOBU. One example of such a predetermined position is in a sequence of packs of compression image data of I pictures (including the first and the last of the I pictures). Normally, image data of an I picture is included in a plurality of video packs. As an example of the multiplexing position, the pack of additional information is placed, for example, before the first video pack or after the last video pack in the plurality of video packs of I pictures.

As another example of the multiplexing position, instead of the first or the last of a plurality of video packs of I pictures, the additional information pack may be placed before or after the pack at a particular ordinal position counting from the first of the video packs of image data of I pictures. Furthermore, since reading and writing are performed in units of VOBUs, the additional information pack may be multiplexed, for example, at the rearmost end of the VOBU unit, instead of a neighbor of an I picture. In addition, the pack of additional information may be placed at a predetermined center position in the VOBU.

As will be described later, only the I-picture portion in the VOBU is extracted for image playback at the time of variable-speed playback. Therefore, by multiplexing the additional information pack at a predetermined position in the I pictures, including the first and last of the I pictures, as described above, the additional information is easily extracted together with I pictures for playback when only the I pictures in the VOBU are extracted.

Figure 5:
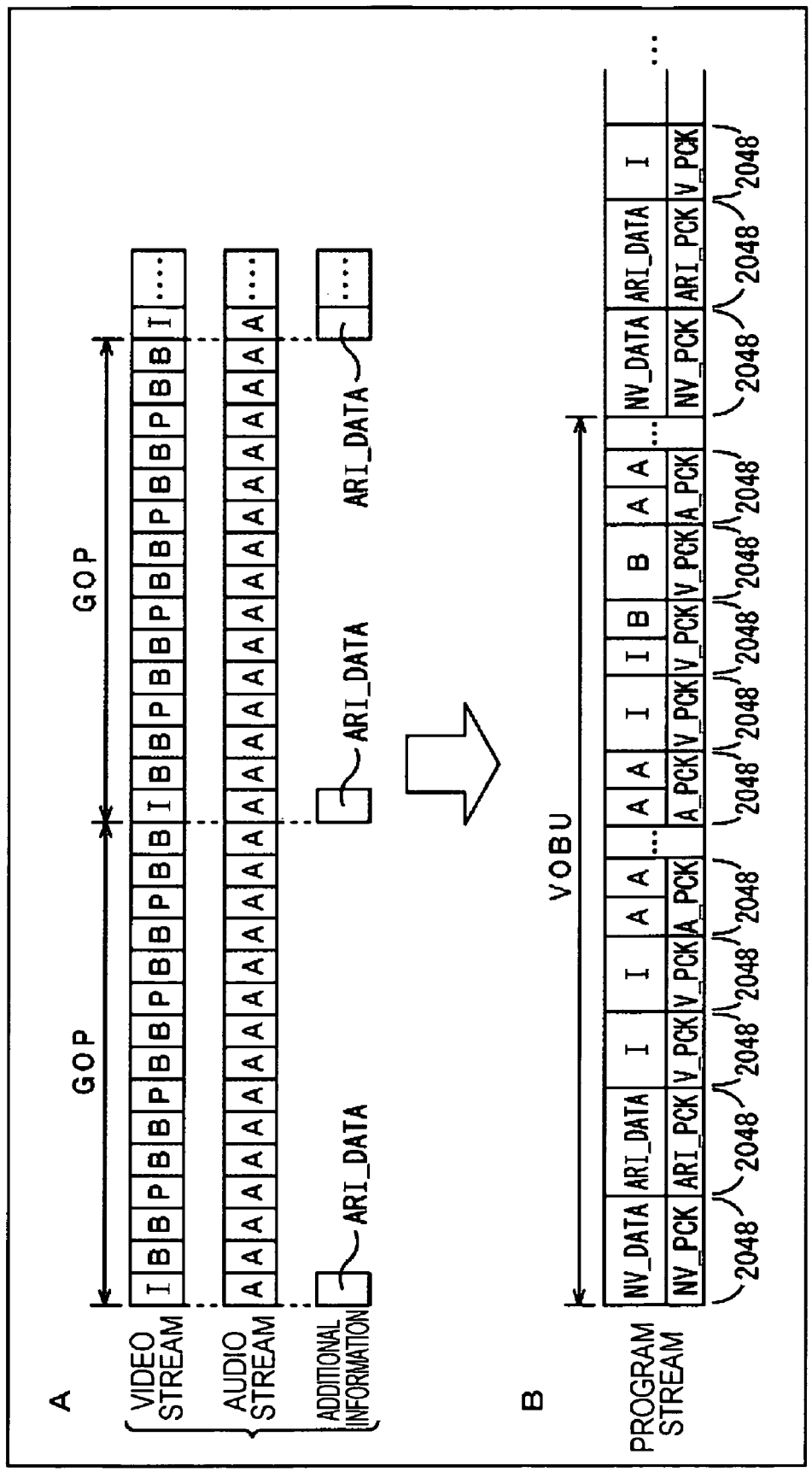
FIG. 5 is a diagram illustrating ARI_DATA, NV_PCK, and ARI_PCK.

FIG. 5 is a diagram illustrating multiplexing of image data, audio data, and additional information for 1GOP. In this example, 1GOP is assumed to include 15 frames (15 pictures), and furthermore, image-capture information about image data for an I picture is multiplexed as additional information.

A in FIG. 5 indicates a stream of each of image data, audio data, and additional information. B in FIG. 5 indicates a stream structure of 1VOBU in a multiplexed MPEG-PS format.

In the image data stream shown in A of FIG. 5, B, I, and P indicate frame-by-frame image data taking into consideration the picture type. I, B, and P in the figure indicate an I picture, a B picture, and a P picture, respectively. A in the audio stream of FIG. 5 indicates audio data corresponding to each image frame.

Furthermore, as described above, in this example, the additional information ARI_DATA shown in A of FIG. 5 indicates additional information composed of image-capture information when the I picture in 1GOP of image data is acquired. In this example, this additional information ARI_DATA is data that is constant over the period of 1GOP.

The image data shown in A of FIG. 5 is subjected to compression encoding and variable-length encoding, for example, in the encoding/decoding section 14 after the pictures are re-ordered. In the encoding/decoding section 14, the compression image data of each picture is multiplexed in the form of one or more video packs V_PCK, as shown in B of FIG. 5. At this time, in the encoding/decoding section 14, in the image data of each picture, a timestamp PTS, which is time management information for playback output, is included in the header of the packet including the start of each picture.

In B of FIG. 5, symbols I, B, and P in the box of each video pack V_PCK indicate the picture type of the compression image data in the image pack in question: one of the I picture, B picture, and P picture.

Furthermore, the audio data shown in A of FIG. 5 is subjected to MPEG audio compression in the encoding/decoding section 14 and is then multiplexed between video packs V_PCK in the encoding/decoding section 14 as audio packs A_PCK for each predetermined amount of data, as shown in B of FIG. 5.

Also for the audio data, a timestamp PTS, which is time management information for playback output, is included in the header of the packet for each audio frame by the encoding/decoding section 14. If one packet includes data for a plurality of frames, the timestamp PTS for the first frame is inserted into the packet header.

The additional information ARI_DATA shown in A of FIG. 5 is written from the control section 11 to the work memory 15, and one additional information pack ARI_PCK is formed for each 1GOP in the work memory 15. As shown in B of FIG. 5, in this example, this additional information pack ARI_PCK is multiplexed at the first of a plurality of image packs of I pictures in the VOBU.

As described above, this additional information pack ARI_PCK includes additional information ARI_DATA in the form of a packet, and furthermore, the packet header includes the same timestamp PTS as the timestamp PTS included in the packet of the first pack of the I pictures in the same GOP.

The first pack NV_PCK in the VOBU including 1GOP of data is called a navigation pack, which includes, for example, playback management information such as data search information (e.g., control information for specifying which sector to jump to at a jump time). As shown in B of FIG. 5, the additional information pack ARI_PCK is multiplexed immediately after the navigation pack NV_PCK.

One example of ARI_DATA in the ARI_PCK in the DVD+RW video recording format described above is shown in FIG. 6.

In FIG. 6, the RBP (Reference Byte Position) indicates a relative byte position in the packet, where the beginning of the additional information ARI_DATA is "0."

As shown in FIG. 6, the additional information ARI_DATA includes an additional record identifier, application information, recording time information, and camera information.

The additional record identifier is an identifier for recognizing that the data in the packet is additional information (additional record information), and an additional record information data identifier and its version number are recorded.

The application information includes a vendor name which is a manufacturer of the product, a product name which is the name of the product, an application ID, data for developers (Manufacturer's Information Data).

The application ID is information for identifying the recording format at recording time. In this example, "00h (h indicates hexadecimal representation, which also applies hereinafter)" indicates recording in the DVD-Video format, while "01h" indicates recording in the DVD-Video Recording format.

The data for developers is an area that developers can use freely, and, for example, debugging data during development is recorded.

The data for developers includes an SVOB identifier indicating whether it is a photo movie. The SVOB identifier is composed of a 2-byte ID, a 1-byte data length, and 1-byte data (actual data). The 2-byte ID in the SVOB identifier is an identifier identifying it is an SVOB identifier. The 1-byte data length in the SVOB identifier indicates the data length of actual data in the SVOB identifier. In short, a value indicating that the actual data is one byte is set to the 1-byte data length in SVOB identifier.

The actual data in the SVOB identifier is data indicating whether or not the data composed of the GOP additionally provided with ARI_DATA including this SVOB identifier is a photo movie. More specifically, actual data equal to a value other than 0 indicates that the data composed of the GOP additionally provided with ARI_DATA is a photo movie, while actual data equal to a value 0 indicates that the data composed of the GOP additionally provided with ARI_DATA is not a photo movie.

As the recording time information, a time zone at the time of recording the additional information ARI_DATA for the VOBU including this additional information (VOBU_L-

CL_TM_ZONE; field name, which also applies hereinafter) and a recording time of the additional information ARI_DATA (VOBU_REC_TM) are recorded.

In this example, the recording time of the additional information ARI_DATA (VOBU_REC_TM) is the time at which the frame of the I picture was captured. In this example, the recording time is represented in the format of year, month, day, hour, minute, and second.

For the time zone at the time of recording the additional information ARI_DATA (VOBU_LCL_TM_ZONE), the time zone for the recording time (VOBU_REC_TM) of the additional information ARI_DATA is recorded. Here, the time zone is an offset time from the UTC (Coordinated Universal Time) set to the device by the user. In short, it is a time difference corresponding to the time of the nation (local time) in which the recording apparatus is used.

As the recording time of the additional information ARI_DATA (VOBU_REC_TM), the universal time (official time used to record the time in the world) can also be used. In this case, the time zone at the time of recording the additional information ARI_DATA (VOBU_LCL_TM_ZONE) is set to zero.

Next, information such as image-capture setting conditions is recorded as camera information. As shown in FIG. 6, the camera information includes information such as a f-number, an exposure time, an exposure program, exposure program extension information, an exposure correction value, an AGC gain value, a lens minimum f-number, a flash, a lens focal length, individual image processing, a white balance, a photographic scene type, a focus mode, a subject distance, a motion blur correction, and a digital zoom factor.

The class of the exposure program used by the camera at image-capturing time is record in the exposure program (EXP_PRG). The class of exposure program includes four types: not specified (Not Specified), manual, normal program, and preset.

Detailed information in a case where the class of the exposure program used by the camera at image-capturing time is "preset" is recorded in the exposure program extension information (EXP_PRG_EX). If the class of the exposure program is not "preset," it is "not specified (Not Specified)." If the class of the exposure program is "preset," one of gain-priority, shutter-priority, and exposure-priority is set.

A value of the AGC gain in the signal processing system is recorded in the AGC gain value. In addition, the status of the strobe at photography time, such as flash ON, flash OFF, red-eye reduction flash, or forced flash, is recorded in the flash (FLS).

Image processing other than normal processing, such as lettering allowing for output, being applied to image data is recorded in the individual image processing (CST_REN).

The adjustment mode of white balance set at photography time is recorded in the white balance (WHT_BAL). For the adjustment mode of white balance, items such as "automatic," "hold (HOLD)," "manual," "candle," "incandescent lamp," "fluorescent lamp with a low color temperature," "fluorescent lamp with a high color temperature," "sunlight," "overcast light," and "not specified" can be set.

The set subject type at photography time is recorded in the photographic scene type (SCN_CAP_TYP). In this example, "standard," "landscape," "portrait," "night scene," and "not specified" can be set as the subject type.

The focus mode set at photography time, such as "automatic focus," "manual focus," and "not specified," is recorded in the focus mode (FCS_MOD).

Whether the motion blur correction function was enabled, such as "motion blur correction on" or "motion blur correction off", and "not specified," is recorded in the motion blur correction (IMG_STB).

The digital zoom factor used at photography time is recorded in the digital zoom factor (DIG_ZOM). If the digital zoom was not used, "00h" is recorded.

Location information from a GPS receiver section 60 (or acquired via communication means) is recorded in the location information (GPS_INFO).

If motion blur of the digital camera exceeded a correction limit, a flag indicating that fact is recorded in the motion blur correction limit (STB_LIM). If the motion blur of the digital camera actually exceeds the correction limit, "FF (in hexadecimal)" is recorded as this flag.

Figure 7:
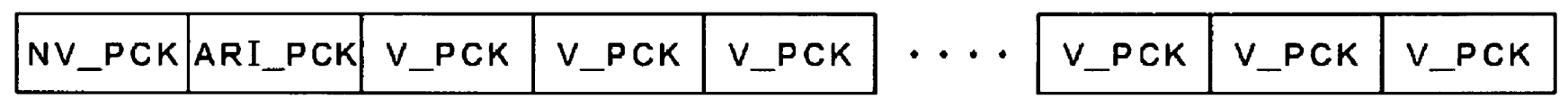

An exemplary structure of a photo movie will now be described with reference to FIGS. 7 and 8. FIG. 4 is a diagram illustrating an exemplary structure of image data which is a photo movie. A navigation pack NV_PCK is disposed at the beginning of image data which is a photo movie. In image data which is a photo movie, the navigation pack NV_PCK is followed by an additional information pack ARI_PCK.

As described above, a value other than 0 is set in the actual data in the SVOB identifier of data for developers in the additional information pack ARI_PCK.

In image data which is a photo movie, the additional information pack ARI_PCK is followed by a predetermined number of video packs V_PCK each storing an item of image data which is an I picture. A timestamp PTS indicating the start time for displaying an image displayed by the I picture is stored in the header of the video pack V_PCK.

Figure 8:
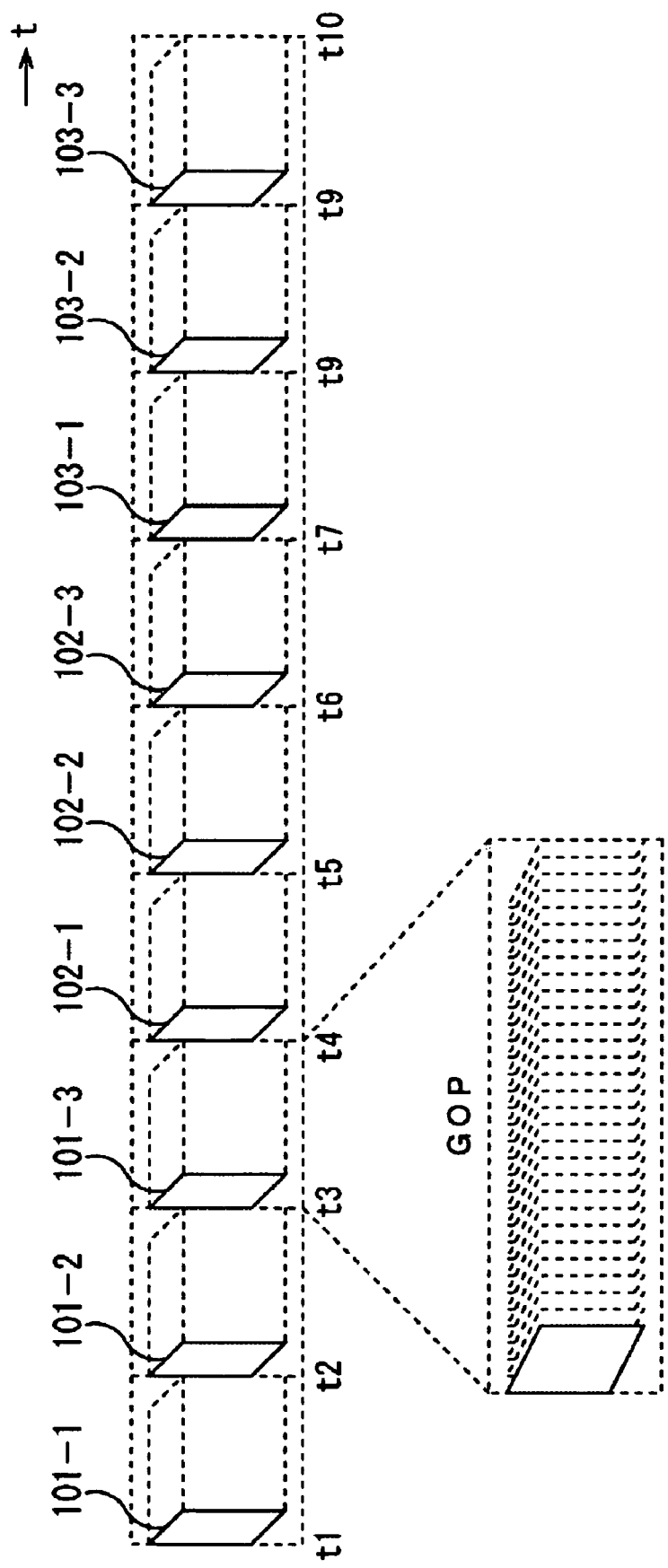
FIG. 8 is a diagram illustrating an example of a photo movie.

FIG. 8 is a diagram illustrating an image displayed by a photo movie. In FIG. 8, the horizontal direction represents time. In FIG. 8, solid-line rectangles indicate one frame displayed by an I picture stored in the photo movie, while dot-line rectangles indicate one frame not containing data corresponding to the photo movie.

One I picture is stored in one VOBU of the photo movie. In other words, each GOP of the photo movie includes one I picture.

For example, the first GOP of the photo movie includes a frame 101-1 which is an I picture, the second GOP of the photo movie includes a frame 101-2 which is an I picture, and the third GOP of the photo movie includes a frame 101-3 which is an I picture. The frames 101-1 to 101-3 are composed of the same image.

The fourth GOP of the photo movie includes a frame 102-1 which is an I picture, the fifth GOP of the photo movie includes a frame 102-2 which is an I picture, and the sixth GOP of the photo movie includes a frame 102-3 which is an I picture. The frames 102-1 to 102-3 are composed of the same image.

Similarly, the seventh GOP of the photo movie includes a frame 103-1 which is an I picture, the eighth GOP of the photo movie includes a frame 103-2 which is an I picture, and the ninth GOP of the photo movie includes a frame 103-3 which is an I picture. The frames 103-1 to 103-3 are composed of the same image.

A timestamp PTS indicating, for example, a time t1 which corresponds to 0 seconds is added to the I picture for displaying the frame 101-1, which is the first frame of the first GOP of the photo movie. A timestamp PTS indicating, for example, a time t2 which corresponds to 1 second is added to the I picture for displaying the frame 101-2, which is the first frame of the second GOP of the photo movie. A timestamp PTS indicating, for example, a time t3 which corresponds to 2 seconds is added to the I picture for displaying the frame 101-3, which is the first frame of the third GOP of the photo movie.

Similarly, timestamps PTS indicating, for example, a time t4 which corresponds to 3 seconds, a time t5 which corresponds to 4 seconds, and a time t6 which corresponds to 5 seconds, respectively, are added to the I pictures for displaying the frames 102-1 to 102-3, respectively. In addition, timestamps PTS indicating, for example, a time t7 which corresponds to 6 seconds, a time t8 which corresponds to 7 seconds, and a time t9 which corresponds to 8 seconds, respectively, are added to the I pictures for displaying the frames 103-1 to 103-3, respectively. Timestamps PTS each indicating a time t10 which corresponds to 9 seconds are add to the frame subsequent to the frame 102-3, not shown in the figure.

The frame 101-1 is displayed from the time t1 corresponding to 0 seconds indicated by the timestamp PTS to the time t2 corresponding to 1 second indicated by the timestamp PTS added to the frame 101-2. The frame 101-2 is displayed from the time t2 corresponding to 1 second indicated by the timestamp PTS to the time t3 corresponding to 2 seconds indicated by the timestamp PTS added to the frame 101-3. The frame 101-3 is displayed from the time t3 corresponding to 2 seconds indicated by the timestamp PTS to the time t4 corresponding to 3 second indicated by the timestamp PTS added to the frame 102-1.

Similarly, the frame 102-1 is displayed from the time t4 to the time t5, the frame 102-2 is displayed from the time t5 to the time t6, and the frame 102-3 is displayed from the time t6 to the time t7. The frame 103-1 is displayed from the time t7 to the time t8, the frame 103-2 is displayed from the time t8 to the time t9, and the frame 103-3 is displayed from the time t9 to the time t10.

More particularly, assuming that 30 frames are displayed in 1 second, for the frame 101-3 for example, the frame obtained by decoding the I picture is displayed at the time t3 corresponding to 2 seconds indicated by the timestamp PTS. Since the timestamp subsequent to the timestamp PTS indicating the time t3 indicates the time t4, the frame 101-3 is displayed as-is for the 29 frames after the time t3 and before the time t4.

Therefore, the frame 101-3 appears being displayed as a static image from the time t3 corresponding to 2 seconds to the time t4 corresponding to 3 seconds.

As described above, the frames 101-1 to 101-3 are composed of the same image, the frames 102-1 to 102-3 are composed of the same image, and the frames 103-1 to 103-3 are composed of the same image. Therefore, one static image is displayed from the time t1 corresponding to 0 seconds to the point just before the time t4 corresponding to 3 seconds, the subsequent one static image is displayed from the time t4 corresponding to 3 seconds to the point just before the time t7 corresponding to 6 seconds, and the subsequent one static image is displayed from the time t7 corresponding to 6 seconds to the point just before the time t10 corresponding to 9 seconds.

Figure 9:
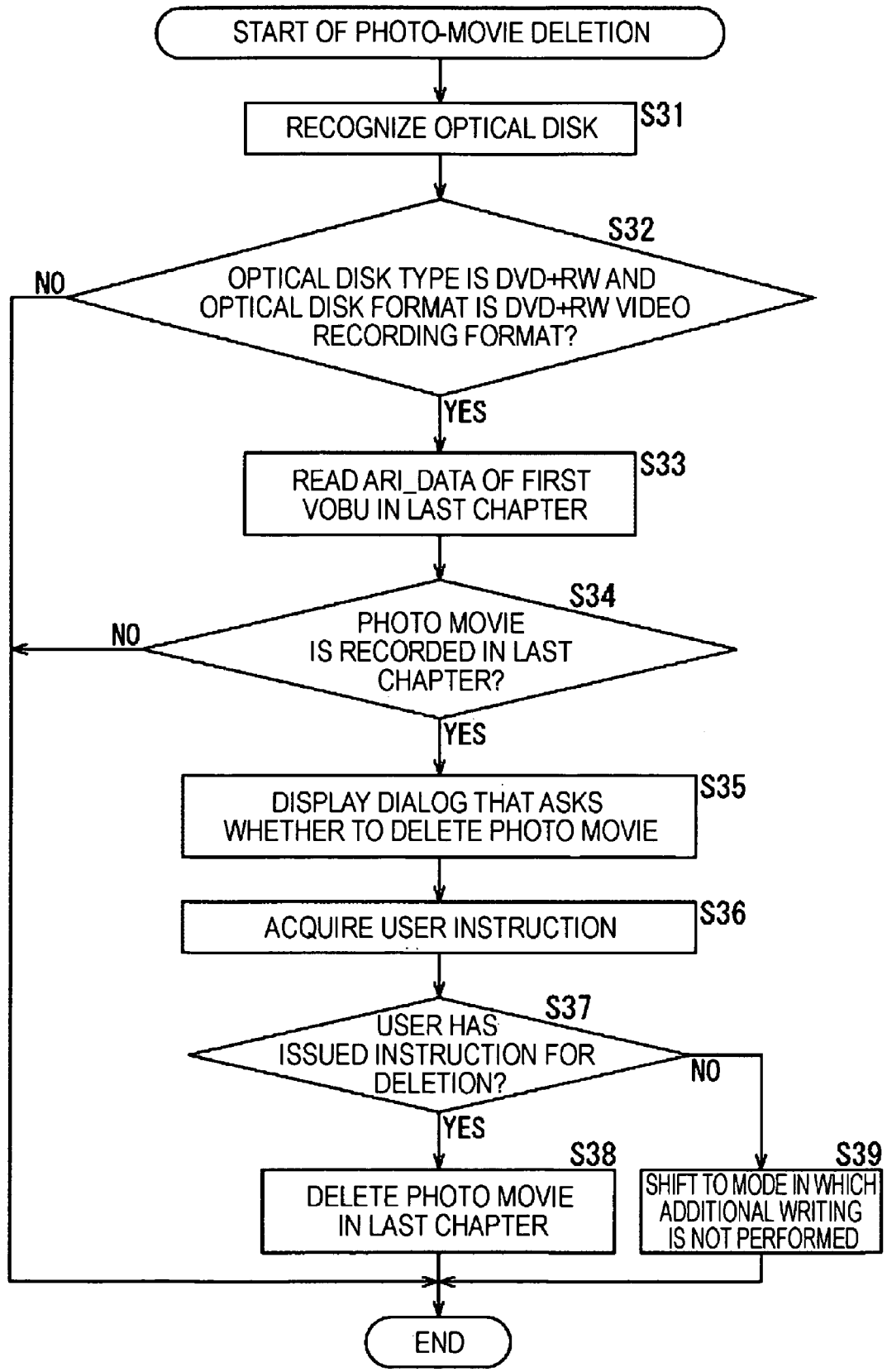
FIG. 9 is a flowchart illustrating processing for deleting a photo movie.

Next, processing for deleting a photo movie that is carried out when the optical disk 17 is mounted in the drive 16 or when the recording/playback apparatus is started up will be described with reference to the flowchart in FIG. 9. In step S31, the type identifying section 84 of the recording/playback control section 71 recognizes the optical disk 17 mounted in the drive 16. More specifically, in step S31, the type identifying section 84 recognizes the optical disk 17 by acquiring information for identifying the physical type of the optical disk 17 and the formatting method of the optical disk 17 from the drive 16.

Here, the physical type of the optical disk 17 refers to a type determined by the physical structure of the optical disk 17, such as the DVD+RW, the DVD+R, the DVD-RW, and the DVD-R. Furthermore, the formatting method of the optical disk 17 refers to a formatting method for the optical disk 17 at the application level.

In step S32, the type identifying section 84 determines whether the physical type of the optical disk 17 is the DVD+RW and the formatting method of the optical disk 17 is the DVD+RW video recording format. If it is determined that the physical type of the optical disk 17 is the DVD+RW and the formatting method of the optical disk 17 is the DVD+RW video recording format, the flow proceeds to step S33, where the playback control section 82 reads out the ARI_DATA of the first VOBU in the last chapter of the optical disk 17. In short, in step S33, the playback control section 82 reads out from the optical disk 17 the ARI_DATA, which is attribute data indicating the attribute of the data recorded at the rearmost end of the logical recording space on the optical disk 17.

In step S34, the data-format identifying section 86 determines whether a photo movie is recorded in the last chapter of the optical disk 17 based on the read-out ARI_DATA. More specifically, in step S34, based on the read-out ARI_DATA, which is attribute data, the data-format identifying section 86 determines whether the data recorded on the optical disk 17 serving as a data recording medium is a photo movie, which is display data for displaying one static image for a predetermined period of time or display data for displaying a plurality of static images in a predetermined order one by one at a predetermined interval.

More specifically, the ARI_DATA interpreting section 85 interprets the read-out ARI_DATA, generates data indicating the type of the data recorded in the last chapter of the optical disk 17 according to the result of interpretation, and supplies it to the data-format identifying section 86. Here, the type of data refers to, for example, the type of data for displaying a photo movie or a moving image. The data-format identifying section 86 determines whether a photo movie is recorded in the last chapter of the optical disk 17 based on the data indicating the type of the data recorded in the last chapter of the optical disk 17, that has been supplied from the ARI_DATA interpreting section 85.

If it is determined in step S34 that a photo_movie is recorded in the last chapter of the optical disk 17, the flow proceeds to step S35, where the display control section 88 displays a dialog for asking whether to delete the photo movie on the display apparatus (not shown in the figure) connected to the input/output signal control section 13.

Figure 10:
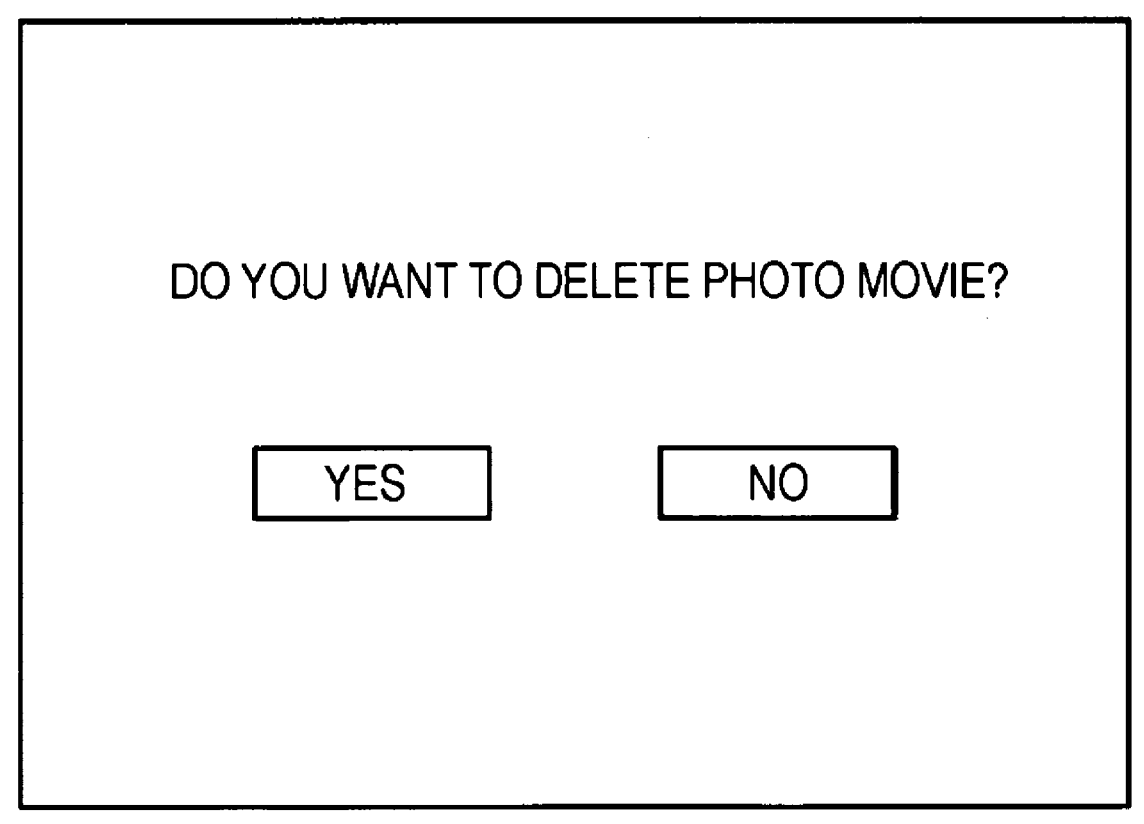

FIG. 10 is a diagram depicting an exemplary dialog for asking whether to delete a photo movie, which is displayed by the control section 88 on the display apparatus connected to the input/output signal control section 13. The dialog displays a sentence such as "Do you want to delete the photo movie?"

In step S36, the input control section 87 acquires a user instruction based on a signal, indicating a user command, that has been supplied by the input section 12. For example, when the button marked "Yes" in the exemplary dialog shown in FIG. 10 is selected, the input control section 87 acquires a user instruction indicating the deletion of the photo movie. On the other hand, when the button marked "No" in the exemplary dialog shown in FIG. 10 is selected, the input control section 87 acquires a user instruction indicating that the photo movie is not deleted.

In step S37, the input control section 87 determines whether the user has issued an instruction for deletion. If it is determined that the user has issued an instruction for deletion, the flow proceeds to step S38, where the delete control section 83 controls the drive 16 to delete the photo movie in the last chapter of the optical disk 17, and the processing ends. When the photo movie in the last chapter of the optical disk 17 is deleted, the recording/playback control section 71 is placed into a mode for appending data on the optical disk 17.

On the other hand, if the user instruction indicates that the photo movie should not be deleted, namely, if it is determined that the user has not issued an instruction for deletion in step S37, the flow proceeds to step S39 without deleting the photo movie in the last chapter of the optical disk 17. Thereafter, the recording/playback control section 71 is placed into a mode in which no data is appended on the optical disk 17, and then the processing ends.

Here, the mode in which no data is appended on the optical disk 17 includes a mode in which processing for appending data on the optical disk 17 is not carried out, as well as a mode in which a user instruction for appending data on the optical disk 17 is not accepted.

If it is determined in step S34 that no photo movie is recorded in the last chapter of the optical disk 17, it is not necessary to delete a photo movie, and therefore, the processing from steps S35 to S39 is skipped and the processing ends.

If it is determined in step S32 that the physical type of the optical disk 17 is not the DVD+RW or the formatting method of the optical disk 17 is not the DVD+RW video recording format, it is not necessary to delete a photo movie. Therefore, the processing from steps S33 to S39 is skipped and the processing ends.

As described above, when the optical disk 17 is mounted on the drive 16 or when the recording/playback apparatus is started up, if the data that is recorded at the rearmost end of the logical recording space (recording area) on the optical disk 17 is a photo movie for displaying one static image for a predetermined period of time or for displaying a plurality of static images in a predetermined order one by one at a predetermined interval, the photo movie is deleted.

If the layout of data recorded on the optical disk 17 is determined such that a photo movie is recorded only at the end of the recording area of the optical disk 17 as is conventionally done, in order to maintain such a layout the user has been forced to check whether a photo movie is recorded at the rearmost end of the logical recording space (recording area) on the optical disk 17 every time, and if a photo movie is recorded, the user has been required to perform the operation of deleting this photo movie.

In contrast, according to the recording/playback apparatus of the present invention, if the layout of data recorded on the optical disk 17 is determined such that a photo movie is recorded only at the end of the recording area on the optical disk 17, when the optical disk 17 is mounted on the drive 16 or when the recording/playback apparatus is started up, the user can quickly append desired data onto the optical disk 17 without having to perform burdensome operation.

Figure 11:
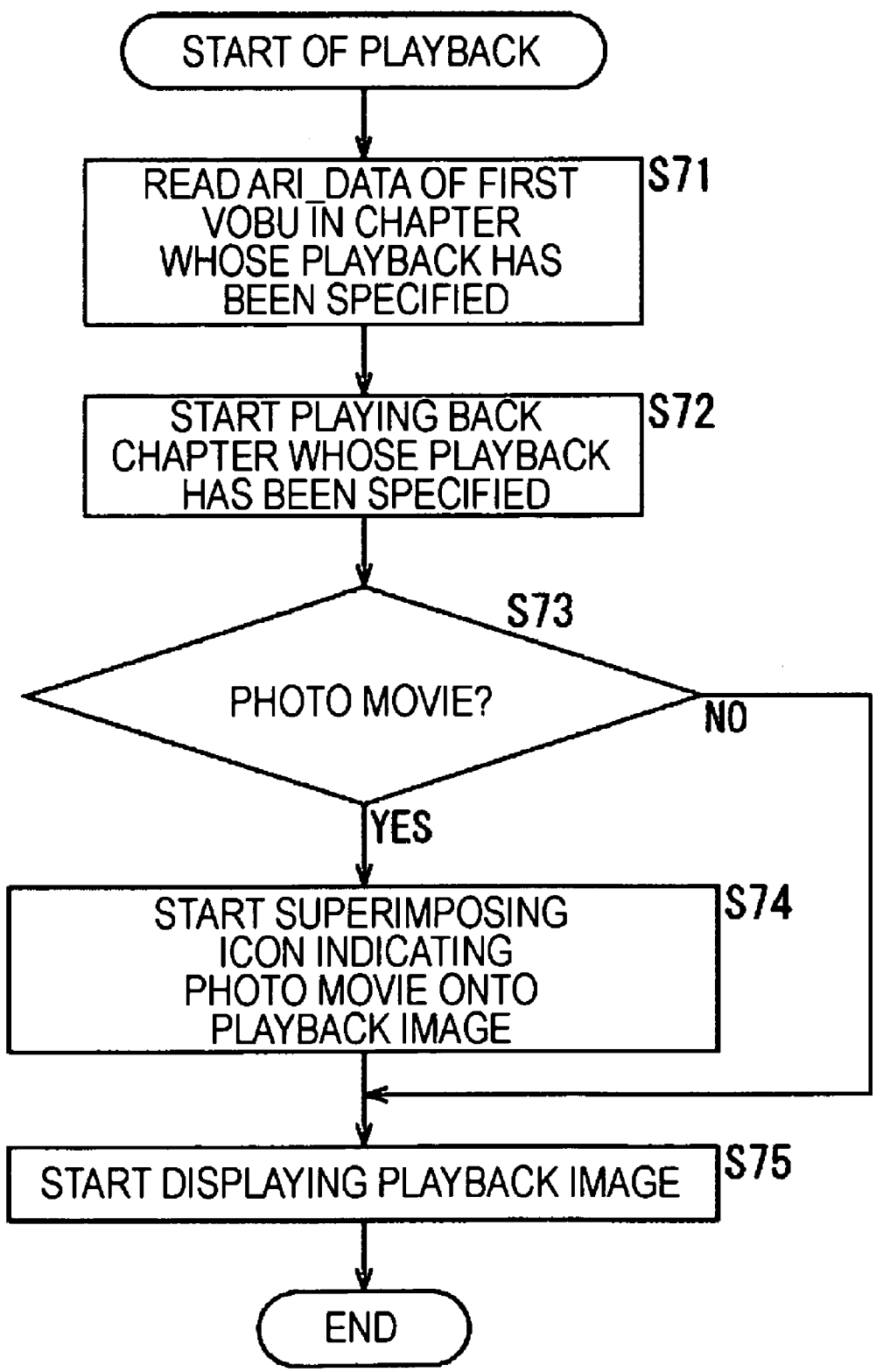
FIG. 11 is a flowchart illustrating playback processing.

FIG. 11 is a flowchart illustrating playback processing by the recording/playback apparatus. In step S71, the playback control section 82 reads out the ARI_DATA in the first VOBU of the chapter whose playback has been specified.

In step S72, the playback control section 82 starts playing back the chapter whose playback has been specified. More specifically, the playback control section 82 causes the drive 16 to start reading from the mounted optical disk 17 the image data in the chapter whose playback has been specified. The image data read out from the optical disk 17 is stored temporarily in the work memory 15. Thereafter, the playback control section 82 causes the encoding/decoding section 14 to start decoding the encoded image data that is temporarily stored in the work memory 15.

In step S73, the playback control section 82 determines whether the image data whose playback has been started is a photo movie based on the read-out ARI_DATA. If it is determined that the image data is a photo movie, the flow proceeds to step S74, where superimposing (image data for) an icon indicating a photo movie onto the playback image is started and the flow proceeds to step S75. For example, the icon indicating a photo movie may be an image formed to resemble a still camera. The image data for the icon indicating a photo movie is pre-stored in the ROM 32.

More specifically, the ARI_DATA interpreting section 85 interprets the ARI_DATA read out via the processing in step S71, generates data indicating the type of the data recorded in the chapter whose playback has been specified from among the chapters on the optical disk 17 according to the result of interpretation, and supplies it to the playback control section 82. The playback control section 82 determines whether a photo movie is recorded in the chapter whose playback has been specified on the optical disk 17 based on the data indicating the type of data supplied from the ARI_DATA interpreting section 85.

If it is determined that this is a photo movie, the playback control section 82 reads out the image data for the icon indicating a photo movie pre-stored in the ROM 32 and supplies the read-out image data to the input/output signal control section 13. The playback control section 82 causes the input/output signal control section 13 to superimpose the image data for the icon onto the playback image, that is, the decoded image data supplied from the encoding/decoding section 14.

If it determined in step S73 that the image data whose playback has been started is not a photo movie, the processing in step S74 is skipped and the procedure proceeds to step S75.

In step S75, the playback control section 82 starts displaying the playback image and the processing ends. More specifically, the playback control section 82 supplies data for displaying the playback image to the display apparatus connected to the input/output signal control section 13 to display the image on the display apparatus.

As described above, if the playback image data is a photo movie, display is performed with an icon indicating a photo movie superimposed over the display image as OSD (On Screen Display), whereas if the playback image data is not a photo movie, the icon indicating a photo movie is not superimposed over the display image. Thus, the user is enabled to identify the type of image data correctly according to the type of image data.

Figure 12:
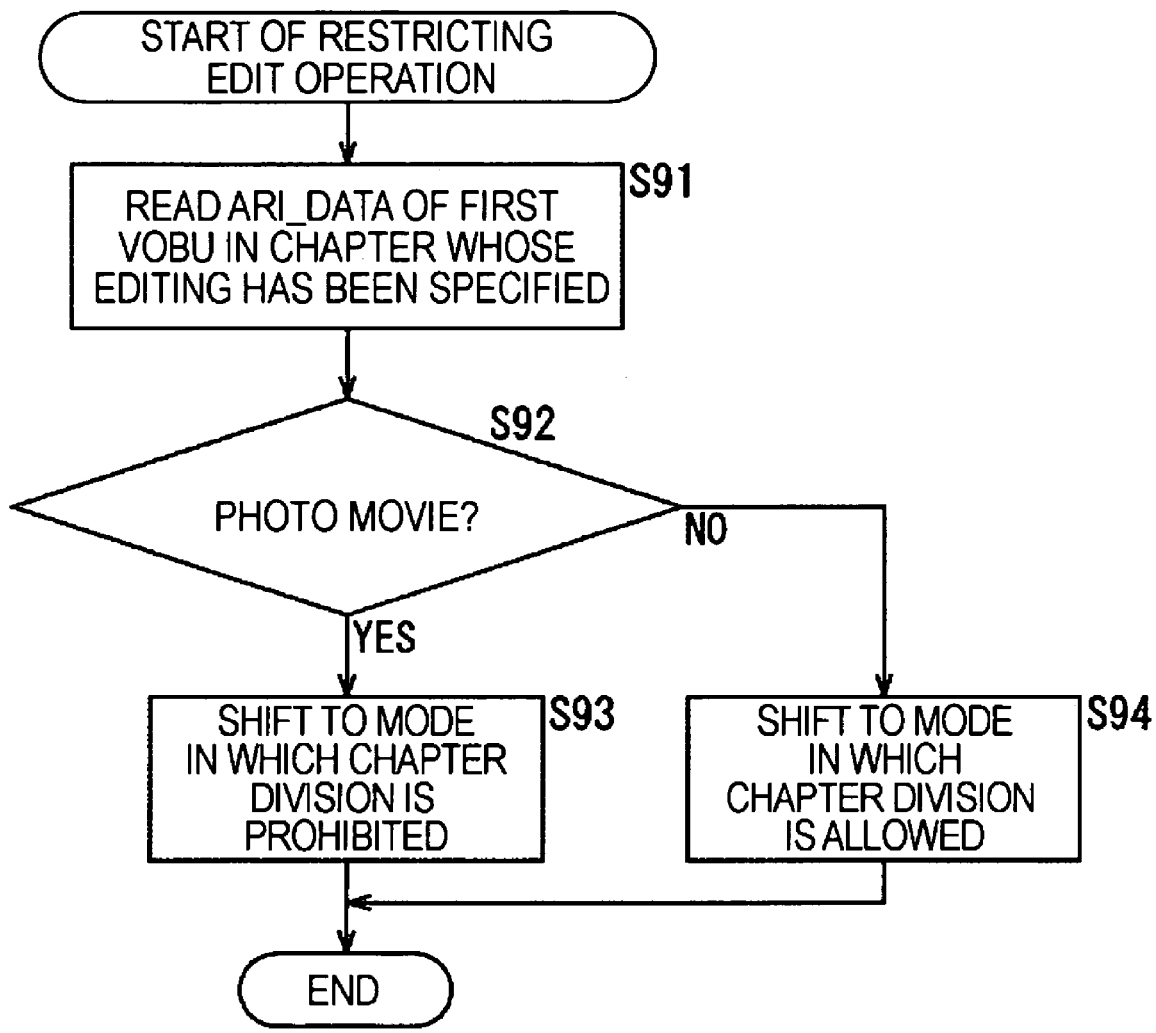
FIG. 12 is a flowchart illustrating processing for restricting editing.

The restriction of editing will be described. FIG. 12 is a flowchart illustrating processing for restricting editing by the recording/playback apparatus. In step S91, the recording/playback control section 71 reads out the ARI_DATA of the first VOBU in the chapter whose editing has been specified.

In step S92, the recording/playback control section 71 determines whether the image data of the chapter whose editing has been specified is a photo movie based on the read-out ARI_DATA. If it is determined that the image data is a photo movie, a mode in which chapter division is prohibited is entered in step S93 and the processing ends. The mode in which chapter division is prohibited includes a mode in which processing for prohibiting chapter division is not carried out, as well as a mode in which a user instruction for dividing a chapter is not accepted, such as to override user's operations on the input section 12 (to ignore signals from the input section 12) and to disable the division button for specifying division on the editing screen of the OSD.

If it is determined in step S92 that the image data of the chapter whose editing has been specified is not a photo movie, the flow proceeds to step S94, where a mode in which chapter division is allowed is entered and the processing ends.

As described above, editing image data can be reliably restricted according to the image data to be edited.

In step S93, the recording/playback control section 71 may allow a function applicable only to photo movies to be carried out.

In addition, if the optical disk 17 is formatted in the DVD-video recording (VIDEO RECORDING) format (hereinafter, referred to as the DVD-VR format), a photo movie is stored in a file of the VR_STILL.VRO format. Therefore, for the DVD-VR format, image data for a photo movie can be discriminated from image data for a moving image based on the file format.

However, some devices allow data other than photo movies to be stored in files of VR_STILL.VRO format.

Therefore, trying to identifying a photo movie just based on whether it is a file in the VR_STILL.VRO format may pose a problem such that processing allowed for photo movies is applied to or processing prohibited for photo movies cannot be carried out on data other than photo movies.

In view of this circumstance, it can be more correctly identified whether the data recorded on the optical disk 17 is a photo movie or not by recording ARI_DATA onto the optical disk 17 in association with the data recorded on the optical disk 17 formatted in the DVD-VR format. In the DVD-VR format, ARI_DATA is recorded in the data for developers (Manufacturer's Information Data) of the RDI_PCK, which corresponds to the NV_PCK in the DVD+RW video recording format.

Although the photo movie is recorded on the optical disk 17 in the above description, the photo movie may be recorded not only on the optical disk 17 but also on the magnetic disk 41, the magneto-optical disk 42, or the semiconductor memory 43. Even if the photo movie is recorded on the magnetic disk 41, the magneto-optical disk 42, or the semiconductor memory 43, the same processing as the above-described processing can be carried out.

As described above, if reading from an optical disk attribute data indicating the attribute of data recorded on the optical disk is controlled, the data recorded on the optical disk can be identified. In addition, if reading from an optical disk attribute data indicating the attribute of data recorded on the optical disk is controlled, it is determined based on the read-out attribute data whether the data recorded on the optical disk is display data for displaying one static image for a predetermined period of time or display data for displaying a plurality of static images in a predetermined order one by one at a predetermined interval, and if it is determined that the data recorded on the optical disk is display data, deletion of data from the optical disk is controlled such that the display data is deleted from the optical disk, then the relative layout of data recorded on the optical disk can be maintained on the optical disk without having to requiring a user to perform burdensome operation.

The sequence of processing described above can be executed using not only hardware but also software. If the sequence of processing is to be executed with software, a program constituting the software is installed from a recording medium into a computer built in dedicated hardware or into, for example, a general-purpose personal computer which can carry out various types of functions by installing various types of programs.

As shown in FIG. 1, this recording medium containing the program may be realized by a package medium including, for example, the magnetic disk 41 (including a flexible disk), the optical disk 17 (including CD-ROM (Compact Disc-Read Only Memory) and DVD (Digital Versatile Disc)), the magneto-optical disk 42 (including MD (Mini-Disc)™), or the semiconductor memory 43 if the program is supplied to the user separately from a computer. The recording medium may also be realized by the ROM 32 or a hard disk (not shown) containing the program if the program is supplied preinstalled in the computer.

The program that carries out the above-described sequence of processing may be installed in a computer through an interface, such as a router or a modem, as required and through a wired or wireless communication medium, such as a local area network, the Internet, or digital satellite broadcasting.

In the present description, the steps of the program recorded on the recording medium may or may not be followed time-sequentially in order of described steps. Furthermore, the steps may be followed in parallel or independently of one another.

The invention claimed is:

1. A recording apparatus comprising:
a read-out control means for controlling the reading, from a data recording medium, of attribute data indicating an attribute of data recorded on the data recording medium;
a determination means for determining, based on the attribute data, whether the data recorded at a rearmost end of a logical recording space on the data recording medium is display data for displaying one static image for a predetermined period of time or is display data for displaying a plurality of static images in a predetermined order one by one at a predetermined interval; and
a delete control means for controlling the deletion of data from the data recording medium so as to delete the display data recorded at the rearmost end of the logical recording space from the data recording medium if it is determined that the data recorded on the data recording medium is the display data.

2. The recording apparatus according to claim 1,
wherein the read-out control means controls the reading of the attribute data from the data recording medium so as to read from the data recording medium when the data recording medium is mounted or when the read-out control means is started up, and
the delete control means controls the deletion of data from the data recording medium so as to delete the display data when the data recording medium is mounted or the delete control means is started up.

3. The recording apparatus according to claim 1, further comprising:
a display control means for controlling the display of a prompt for acquiring an instruction for deleting the display data from a user if it is determined that the data recorded on the data recording medium is the display data; and
an input control means for acquiring the instruction from the user,
wherein the delete control means controls the deletion of data from the data recording medium so as to delete the display data from the data recording medium if deletion of the display data is specified by the user.

4. The recording apparatus according to claim 3, further comprising:
a recording control means for controlling recording onto the data recording medium,
wherein when the deletion of the display data is not specified by the user, the recording control means prevents the recording of data onto the data recording medium and the delete control means controls the deletion of data from the data recording medium so as not to delete the display data from the data recording medium.

5. A recording method comprising:

controlling the reading, from a data recording medium, of attribute data indicating an attribute of data recorded on the data recording medium;

determining, based on the attribute data, whether the data recorded at a rearmost end of a logical recording space on the data recording medium is display data for displaying one static image for a predetermined period of time or is display data for displaying a plurality of static images in a predetermined order one by one at a predetermined interval; and controlling the deletion of data from the data recording medium so as to delete the display data recorded at the rearmost end of the logical recording space from the data recording medium if it is determined that the data recorded on the data recording medium is the display data.

6. A recording device storing a program for causing a computer to perform recording processing comprising:

controlling the reading, from a data recording medium, of attribute data indicating an attribute of data recorded on the data recording medium;

determining, based on the attribute data, whether the data recorded at a rearmost end of a logical recording space on the data recording medium is display data for displaying one static image for a predetermined period of time or is display data for displaying a plurality of static images in a predetermined order one by one at a predetermined interval; and controlling the deletion of data from the data recording medium so as to delete the display data recorded at the rearmost end of the logical recording space from the data recording medium if it is determined that the data recorded on the data recording medium is the display data.

7. A program, stored on a computer-readable storage device, for causing a computer to execute:

a read-out control step of controlling the reading, from a data recording medium, of attribute data indicating an attribute of data recorded on the data recording medium;

a determination step of determining, based on the attribute data, whether the data recorded at a rearmost end of a logical recording space on the data recording medium is display data for displaying one static image for a predetermined period of time or is display data for displaying a plurality of static images in a predetermined order one by one at a predetermined interval; and a delete control step of controlling the deletion of data from the data recording medium so as to delete the display data recorded at the rearmost end of the logical recording space from the data recording medium if it is determined that the data recorded on the data recording medium is the display data.

8. The method according to claim 5, wherein controlling the reading of the attribute data from the data recording medium occurs when the data recording medium is mounted or when the read-out control means is started up, and controlling the deletion of data from the data recording medium occurs when the data recording medium is mounted or the delete control means is started up.

9. The method according to claim 5, further comprising:

controlling the display of a prompt for acquiring an instruction for deleting the display data from a user if it is determined that the data recorded on the data recording medium is the display data;

acquiring the instruction from the user; and when the user specifies deletion of the display data, controlling the deletion of data from the data recording medium comprises deleting the display data from the data recording medium.

10. The method according to claim 9, wherein when the deletion of the display data is not specified by the user, the method further comprises preventing the recording of data onto the data recording medium; and the controlling the deletion of data from the data recording medium comprises not deleting the display data from the data recording medium.

* * * * *